Patented Dec. 10, 1940

2,224,243

UNITED STATES PATENT OFFICE 2,224,243

INSECTICIDE

Charles Verne Bowen, Bethesda, Md., assignor to Henry A. Wallace, as Secretary of Agriculture of the United States of America, and his successors in office.

No Drawing. Application May 15, 1940, Serial No. 335,359

1 Claim. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

My invention relates to improvements in materials for destroying or checking the growth or multiplication of living organisms, whether plant or animal, which are economically injurious to man.

An object of this invention is to provide a material suitable for use as an insecticide.

Another object of this invention is to provide a material which is relatively non-toxic to man and warm-blooded animals when taken by mouth and which can be used in place of lead arsenate and other chemicals for destroying insects without leaving a harmful residue on fruits and vegetables.

I have found that compounds which may be termed amides containing a heterocyclic nucleus and having less than six carbon atoms in the aliphatic hydrocarbon group, are very effective in killing many species of insects whether applied externally or internally; that these organic compounds may be sprayed or dusted upon delicate foliage without injuring it; that these materials are even more effective than lead arsenate and other commonly used insecticides.

One such compound is 2-furan acrylamide and is represented by the following structural formula:

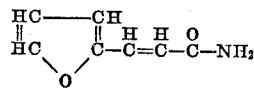

However, the substitution of various organic groups for either one or both of the hydrogen atoms attached to the nitrogen atoms in the above formula is possible and the resulting compounds would also be expected to possess insecticidal properties.

This material may be reduced to an impalpable powder by grinding and applied to vegetation either dry as a dust or made into a suspension and used as a spray. When applied as a spray in water it may be desirable to incorporate wetting agents or stickers. The spray may be made by mechanically suspending the impalpable powder or by first dissolving it in an appropriate solvent such as acetone and pouring the resulting solution into water, whereupon a fine colloidal suspension is obtained. This may be applied directly to the host plant or may be combined with a suitable wetting agent or adhesive and then sprayed.

The efficiency of 2-furan acrylamide as an insecticide is shown by the following results:

(1) When used as a dust at a concentration of 280 micrograms per square centimeter, the compound gave a 96% kill of the 4th instar of the melon worm in 48 hours and a 100% kill in 72 hours, while lead arsenate at 200 micrograms per square centimeter gave a kill of only 8% in 48 hours and 70% in 72 hours when tested against this insect.

(2) When applied as a dust at a concentration of 585 micrograms per square centimeter, 2-furan acrylamide gave a 57% kill of the 4th instar of the Southern army worm in 48 hours.

(3) When tested as a dust at a concentration of 155 micrograms per square centimeter, 2-furan acrylamide gave an 80% kill of the 5th instar of the imported cabbage worm in 48 hours, while derris at a higher concentration, 170 micrograms per square centimeter, gave 96% kill when tested against the same insect.

(4) When tested against screw worm larvae (C. americana) the minimum lethal dose of 2-furan acrylamide was found to be between 0.025 and 0.050%.

Having thus described my invention, what I claim for Letters Patent is:

An insecticide containing as its essential active ingredient, 2-furan acrylamide.

CHARLES VERNE BOWEN.